United States Patent
Shinagawa

(10) Patent No.: US 11,321,033 B2
(45) Date of Patent: May 3, 2022

(54) NON-TRANSITORY COMPUTER-READABLE RECORDING MEDIUM STORING PROGRAM AND INFORMATION PROCESSING APPARATUS

(71) Applicant: BROTHER KOGYO KABUSHIKI KAISHA, Nagoya (JP)

(72) Inventor: Mina Shinagawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/951,079

(22) Filed: Nov. 18, 2020

(65) Prior Publication Data

US 2021/0149611 A1     May 20, 2021

(30) Foreign Application Priority Data

Nov. 19, 2019    (JP) .............................. JP2019-208393

(51) Int. Cl.
    *G06F 3/12*      (2006.01)

(52) U.S. Cl.
    CPC .......... *G06F 3/1243* (2013.01); *G06F 3/1208* (2013.01); *G06F 3/1253* (2013.01)

(58) Field of Classification Search
    CPC .... G06F 3/1242; G06F 40/166; G06F 3/1253; G06F 3/1243; G06F 3/1208; G06F 40/186; B41J 3/4075
    See application file for complete search history.

(56) References Cited

U.S. PATENT DOCUMENTS

| | | | | |
|---|---|---|---|---|
| 2008/0158255 A1* | 7/2008 | Eilers | ..................... | G06F 3/0481 345/629 |
| 2011/0320937 A1* | 12/2011 | Yamamoto | ............ | G06F 40/194 715/256 |
| 2016/0124911 A1* | 5/2016 | Ying | ..................... | G06F 40/186 715/238 |
| 2017/0277675 A1* | 9/2017 | Hirata | ................... | G06F 40/103 |

FOREIGN PATENT DOCUMENTS

JP         2006243388 A     9/2006

\* cited by examiner

*Primary Examiner* — Iriana Cruz

(74) *Attorney, Agent, or Firm* — Scully, Scott, Murphy & Presser, PC

(57) ABSTRACT

A non-transitory computer-readable recording medium stores a program executable by a computer of an information processing apparatus. The program causes the computer to perform operations. The operations include: displaying a selection screen with a first template image and a second template image to be selected; in response to receiving an operation of selection of a template image from the first template image and the second template image displayed on the selection screen, displaying an edit screen including the selected template image; in response to receiving edit operation selected on the edit screen to edit an object arranged in the selected template image, generating edit image data of an edit image including the object having underwent the edit operation; and outputting the generated edit image data.

12 Claims, 16 Drawing Sheets

NON-TRANSITORY COMPUTER-READABLE RECORDING MEDIUM STORING PROGRAM AND INFORMATION PROCESSING APPARATUS

CROSS-REFERENCE TO RELATED APPLICATION

This application claims priority from Japanese Patent Application No. 2019-208393 filed on Nov. 19, 2019, the content of which is incorporated herein by reference in its entirety.

TECHNICAL FIELD

Aspects of the disclosure relate to a non-transitory computer-readable recording medium storing a program and an information processing apparatus.

BACKGROUND

A known non-transitory computer-readable recording medium stores a program for editing images. The recording medium also stores one or more template data for supporting user's editing operation. Through the user's editing operation, template images represented by the template data are displayed for user's selection. The template images are displayed in the same manner as each other.

SUMMARY

Displaying the template images in the same manner may cause the user to be confused to discern the template images from each other. One or more aspects of this disclosure are directed to technique that may help user's selection of the template image.

According to one or more aspects of the disclosure, a non-transitory computer-readable medium stores a program executable by a computer of an information processing apparatus. The program causes the computer to perform operations. The operations include: displaying a selection screen on a display, the selection screen including a first template image and a second template image to be selected, each of the first template image and the second template image being used for editing in response to an edit operation, the edit operation being associated with each of a first edit method and a second edit method, each of the first template image and the second template image being associated with a corresponding edit method, the selection screen being displayed such that each of the first edit method and the second edit method associated with a corresponding template image is in a discernible manner, each of the first template image and the second template image including an object arranged in a corresponding template image; in response to receiving an operation of selection of a template image from the first template image and the second template image displayed on the selection screen, displaying an edit screen including the selected template image; in response to receiving the edit operation on the edit screen to edit an object arranged in the selected template image, generating edit image data of an edit image including the object having underwent the edit operation, the edit image data being generated using an edit method associated with the selected template image; and outputting the generated edit image data.

According to one or more aspects of the disclosure, a non-transitory computer-readable recording medium stores a program executable by a computer of an information processing apparatus. The program causes the computer to perform operations. The operations include: displaying a selection screen on a display, the selection screen including a first template image and a second template image to be selected, each of the first template image and the second template image being used for editing in response to an edit operation, each of the first template image and the second template image including an object arranged in a corresponding template image, the object including an editable object and an uneditable object by the edit operation, the selection screen being displayed such that editable object and the uneditable object are in a discernible manner; in response to receiving an operation of selection of a template image from the first template image and the second template image displayed on the selection screen, displaying an edit screen including the selected template image; and in response to receiving the edit operation on the edit screen to edit an object arranged in the selected template image, generating edit image data of an edit image including the object having underwent the edit operations, the edit image data being generated using an edit method associated with the selected template image; and outputting the generated edit image data.

An information processing apparatus and a control method for implementing the above-described program may have novelty and utility.

DETAILED DESCRIPTION

An illustrative embodiment of the disclosure will be described with reference to drawings. The embodiment described below is merely an example of the disclosure and can be changed as appropriate without departing from the spirit and scope of the disclosure. For example, the sequence of executing steps described below can be changed as appropriate within the scope of the disclosure.

Figure 1:
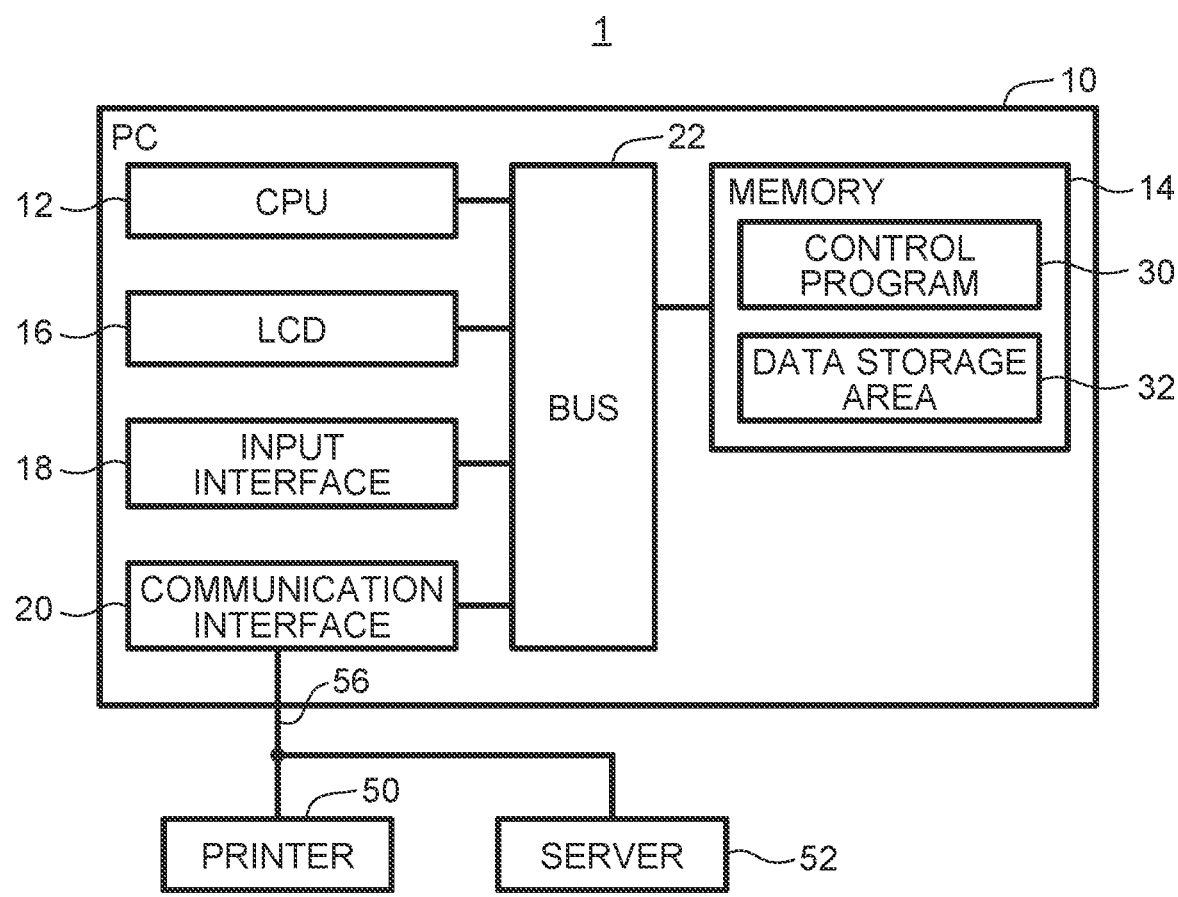
FIG. 1 is block diagram of a printer system.

FIG. 1 is a block diagram of a printer system 1 according to the illustrative embodiment. As illustrated in FIG. 1, the printer system 1 includes a personal computer or PC 10 as an example of an information processing apparatus, a printer 50, and a server 52. The PC 10 includes a central processing unit or CPU 12 as an example of a computer or a controller, a memory 14, a liquid crystal display or LCD 16 as an example of a display interface, an input interface 18 as an example of a user interface, and a communication interface 20, which are communicably connected to one another via a data bus 22.

The PC 10 is communicable with the printer 50 and the server 52 via the communication interface 20 and a communication path 56. As a communication scheme, a wired local area network (LAN), a universal serial bus (USB), Wi-Fi, Bluetooth, or other connection can be used. Wi-Fi is a registered trademark of Wi-Fi Alliance, and Bluetooth is a registered trademark of BLUETOOTH SIG, INC. The printer 50, which is a label printer, for example, sends and receives various kinds of information and instruction signals to and from the PC 10, and produces labels on which objects such as desired text or images are printed based on the control by the PC 10. The server 52 stores various types of image data. The PC 10 obtains image data from the server 52 and allows the LCD 16 to display an image corresponding to the obtained image data.

The CPU 12 executes processing according to a control program 30 (as an example of a program) stored in the memory 14. The control program 30 is an application program, for example, for generating image data of an image to be printed by the printer 50. In the following description, the "control program 30" may translate into "the CPU 12 which executes the control program 30."

The memory 14 includes a data storage area 32. The data storage area 32 is an area for storing data required to execute the control program 30. The memory 14 includes random access memory (RAM), read-only memory (ROM), flash memory, a hard disk drive (HDD), a portable storage medium such as a USB flash drive, which is attachable to the PC 10, and a data buffer on the CPU 12.

The memory 14 may be a computer-readable recording medium. A computer-readable recording medium is non-transitory. A non-transitory medium includes a compact disc read-only memory (CD-ROM) and a digital versatile disc read-only memory (DVD-ROM) besides the above example. A non-transitory medium is also tangible.

The LCD 16 displays various information on the PC 10. The display according to the aspects of the disclosure is not limited to the liquid crystal display. The display may be other display such as an organic electroluminescent display (OELD). The input interface 18 includes a mouse and a keyboard, and is an interface for a user to input operations.

In the printer system 1, the user operates the PC 10 to edit objects to be printed on a label, which is a print medium, by the printer 50. The object is editable with a template. Here, a template is a pattern for arranging objects in a fixed form and is used for printing the objects arranged in the fixed form. When objects are edited using a template, image data for printing is generated and sent to the printer 50. This enables execution of printing the objects on a label using the template.

Figure 2:
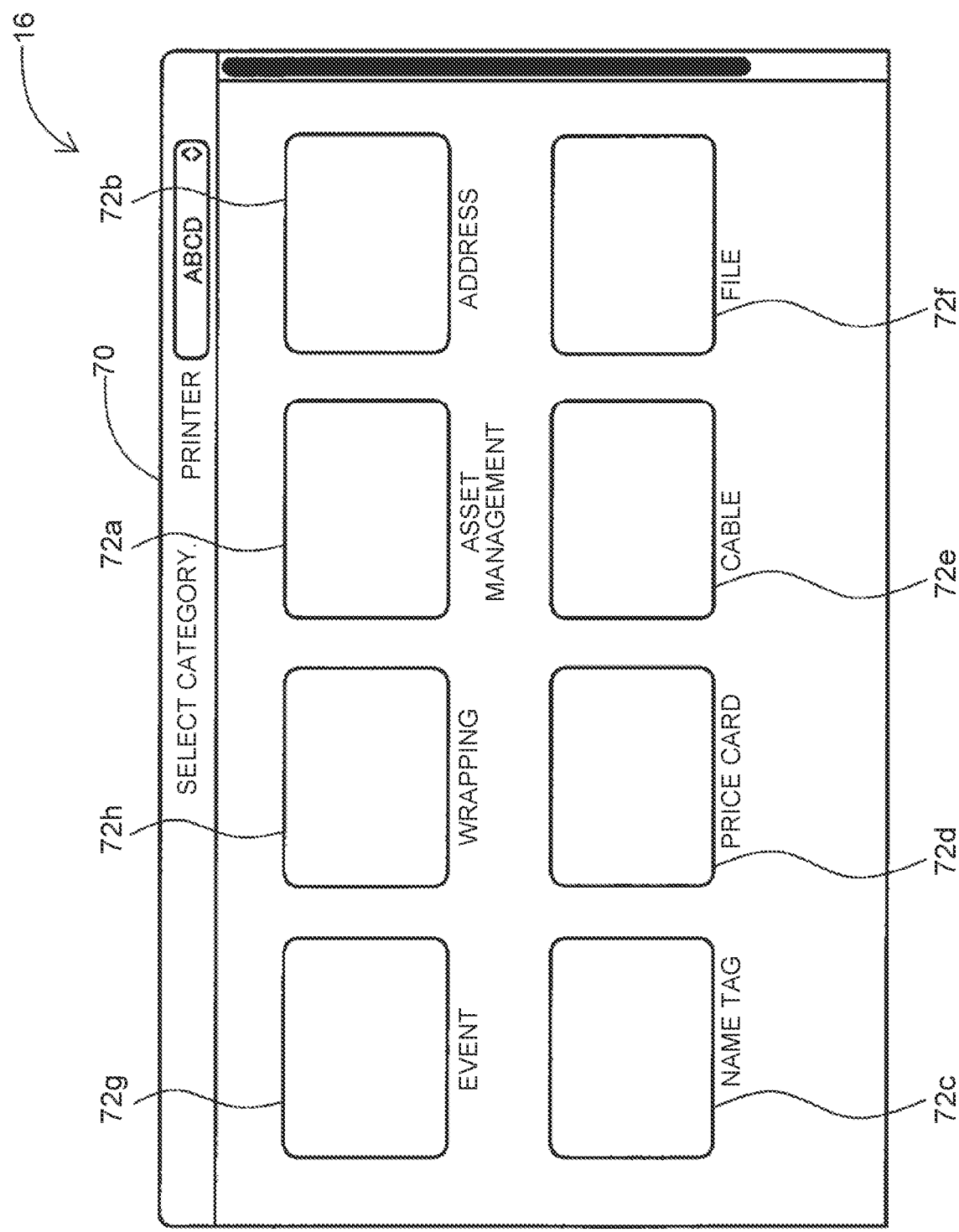
FIG. 2 illustrates a category selection screen.

Specifically, the CPU 12 executes the control program 30 to allow the LCD 16 to display a category selection screen 70 illustrated in FIG. 2. The server 52 stores image data of the category selection screen 70. The CPU 12 obtains image data of the category selection screen 70 from the server 52 and allows the LCD 16 to display the category selection screen 70 based on the image data. The category selection screen 70 is used for selecting a category of templates and displays a plurality of selection buttons 72 corresponding to categories. In response to a user selection of a selection button 72, the LCD 16 displays a selection screen showing templates belonging to the category assigned to the selected selection button 72. The selection screen shows template images. A common or existing selection screen shows template images in the same manner or indiscernible manner.

Figure 3:
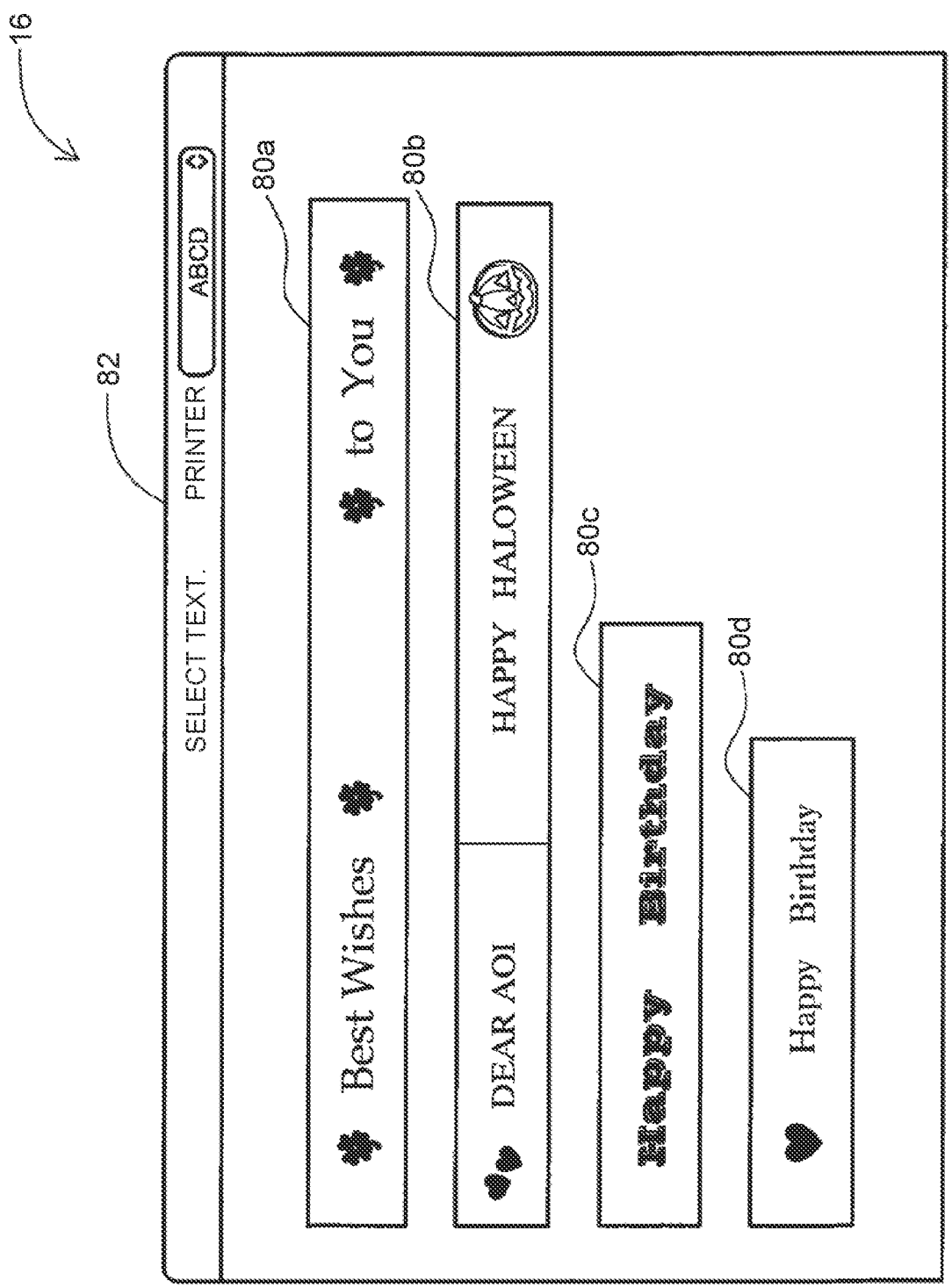
FIG. 3 illustrates a template selection screen.

Specifically, when a selection button 72 is selected on the category selection screen 70, the CPU 12 obtains image data of each of template images belonging to a category assigned to the selected selection button 72 from the server 52. The image data of each of the template images is vector image data and includes information on a size of a template image, a size of an object in the template image, a data type of the object (e.g., text data), and a position of the object in the template image. The CPU 12 generates raster image data based on the vector image data and allows the LCD 16 to display a template image based on the generated image data. As illustrated in FIG. 3, an existing template selection screen 82 with template images 80a, 80b, 80c, and 80d appears on the LCD 16.

In response to a user selection of a template image 80 on the template selection screen 82, the LCD 16 displays an edit screen including the selected template image 80. When objects are edited on the edit screen, the CPU 12 generates image data for printing, as an example of edit image data, indicative of an image including the edited objects. The template images 80 selectable on the template selection screen 82 each can accept a text as an object to be inserted. Methods of generating image data for printing differ according to an object to be inserted such as a text.

Figure 4:
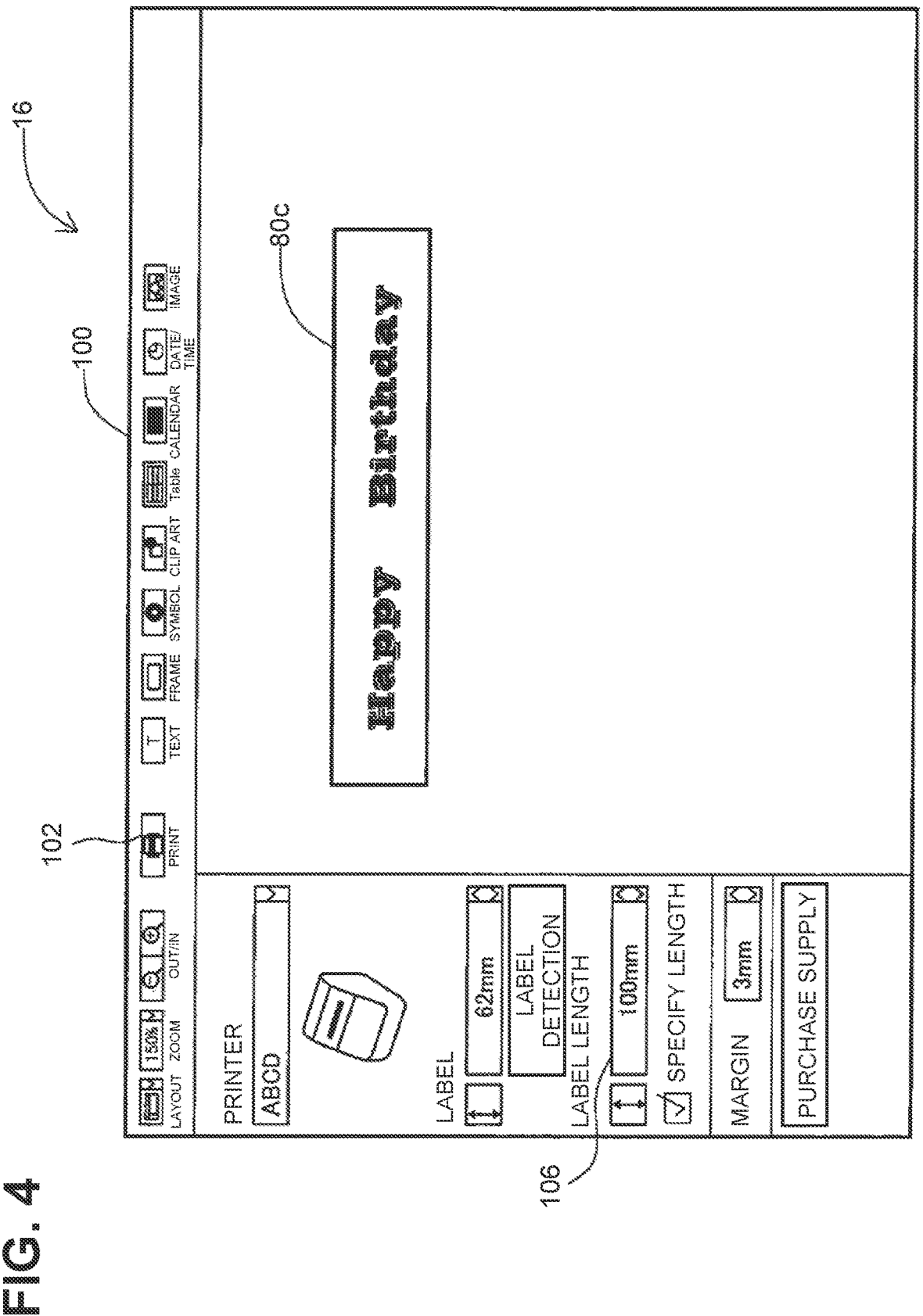
FIG. 4 illustrates an edit screen.
Figure 5:
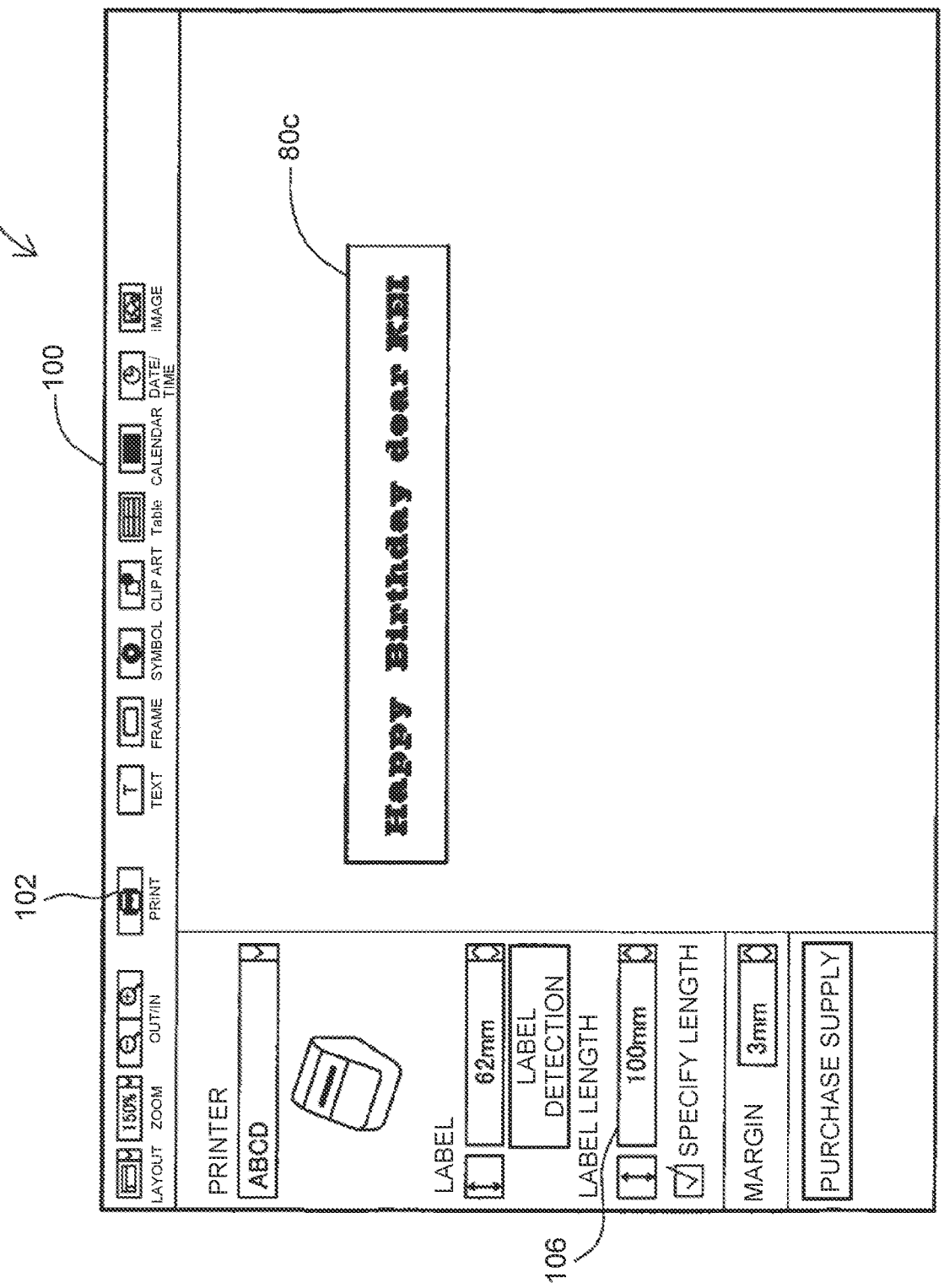
FIG. 5 illustrates an edit screen.

For example, when a template image 80c is selected on the template selection screen 82, the LCD 16 displays an edit screen 100 including the template image 80c as illustrated in FIG. 4. The template image 80c has a default text "Happy Birthday" as an object. When a user inserts a text "dear KEI" into the template image 80c via the input interface 18, a text "Happy Birthday dear KEI" appears in the template image 80c with a reduced font size as illustrated in FIG. 5.

The template image 80c is to be printed on a label having a length (hereinafter referred to as a label length) fixed to a preset length, and thus the template image 80c has a text area (as an example of an arrangement area) with a preset, fixed length. To embed the text in the template image 80c, the font size of the text may be changed. The template image 80c is generated from vector image data that the CPU 12 obtains from the server. The vector image data includes information that the label length is fixed to the preset length or the label length is fixed and that the text area is fixed to the preset length or the text area has a fixed length.

When a print button 102 is selected on the edit screen 100 showing the text "Happy Birthday dear KEI" in the template image 80c, the CPU 12 generates image data for printing the text "Happy Birthday dear KEI" using a reduced font size on a label with a preset length. In other words, the CPU 12 generates image data for printing using a reduced font size such that the text "Happy birthday dear KEI" fits in the preset text area of the template image 80c. This enables printing of the text on the label without changing the label length.

Figure 6:
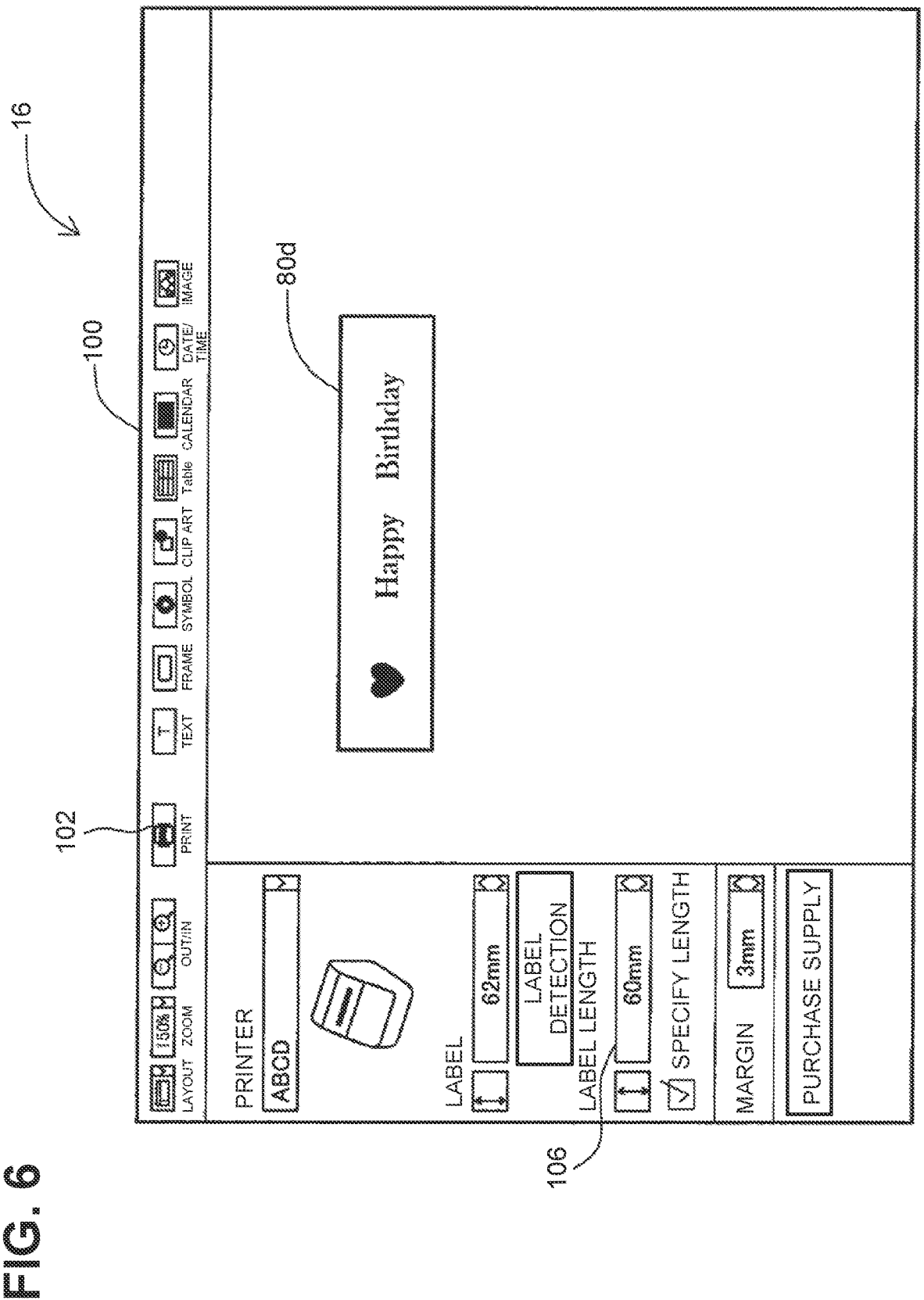
FIG. 6 illustrates an edit screen.
Figure 7:
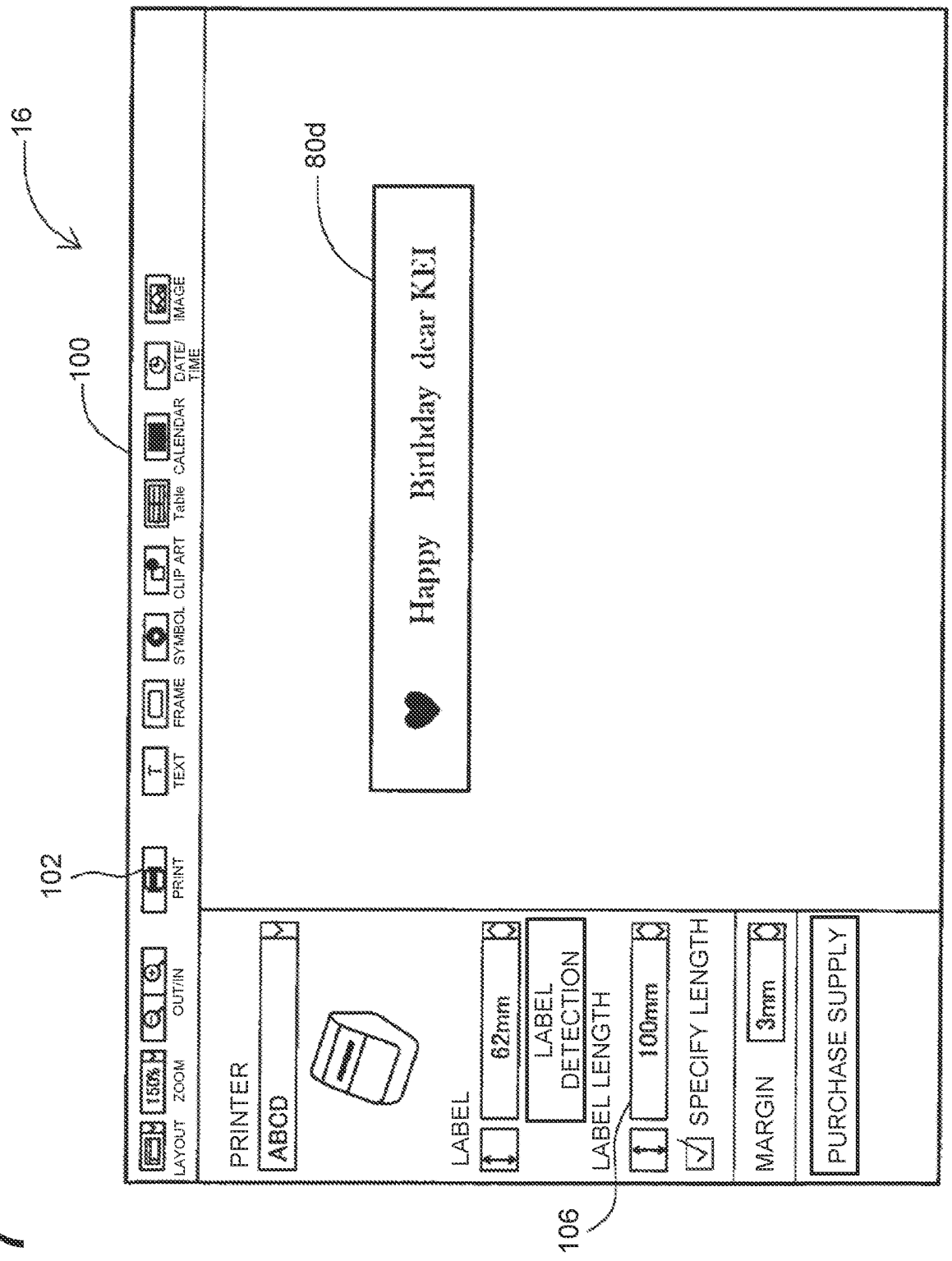
FIG. 7 illustrates an edit screen.

For example, when a template image 80d is selected on the template selection screen 82, the LCD 16 displays an edit screen 100 including the template image 80d as illustrated in FIG. 6. The template image 80d has a heart-shaped symbol and a default text "Happy Birthday" as objects. When a user inserts a text "dear KEI" into the template image 80d via the input interface 18, a text "Happy Birthday dear KEI" appears in the template image 80d becoming elongated, with its front size remaining unchanged, as illustrated in FIG. 7. The length of the template image 80d is elongated by extending its trailing portion.

For the template image 80d, the length of the text area is changeable in association with the length of the whole text, and the label length is changeable with change of the text area. The template image 80d is generated from vector image data that the CPU 12 obtains from the server. The vector image data includes information indicating that the text area varies in accordance with the length of the whole text or the text area is set to "automatic length" and that the label length varies with change of the text area or the label length is set to "Auto". The vector image data of the template image 80*d* further includes information indicating that the heart-shaped symbol is unchangeable. In the template image 80*d*, the heart-shaped symbol cannot be changed to another symbol.

In response to an operation of the print button 102 on the edit screen 100 showing the text "Happy Birthday dear KEI" in the template image 80*d*, the CPU 12 generates image data for printing the heart-shaped symbol and the text "Happy Birthday dear KEI" with an unchanged font size on a label with a length automatically adjusted in accordance with the length of the text. In other words, the CPU 12 generates image data for printing the text "Happy birthday dear KEI" to be embedded in the template image 80*d* without reducing the font size. This enables printing of the text on the label without changing the font size.

Figure 8:
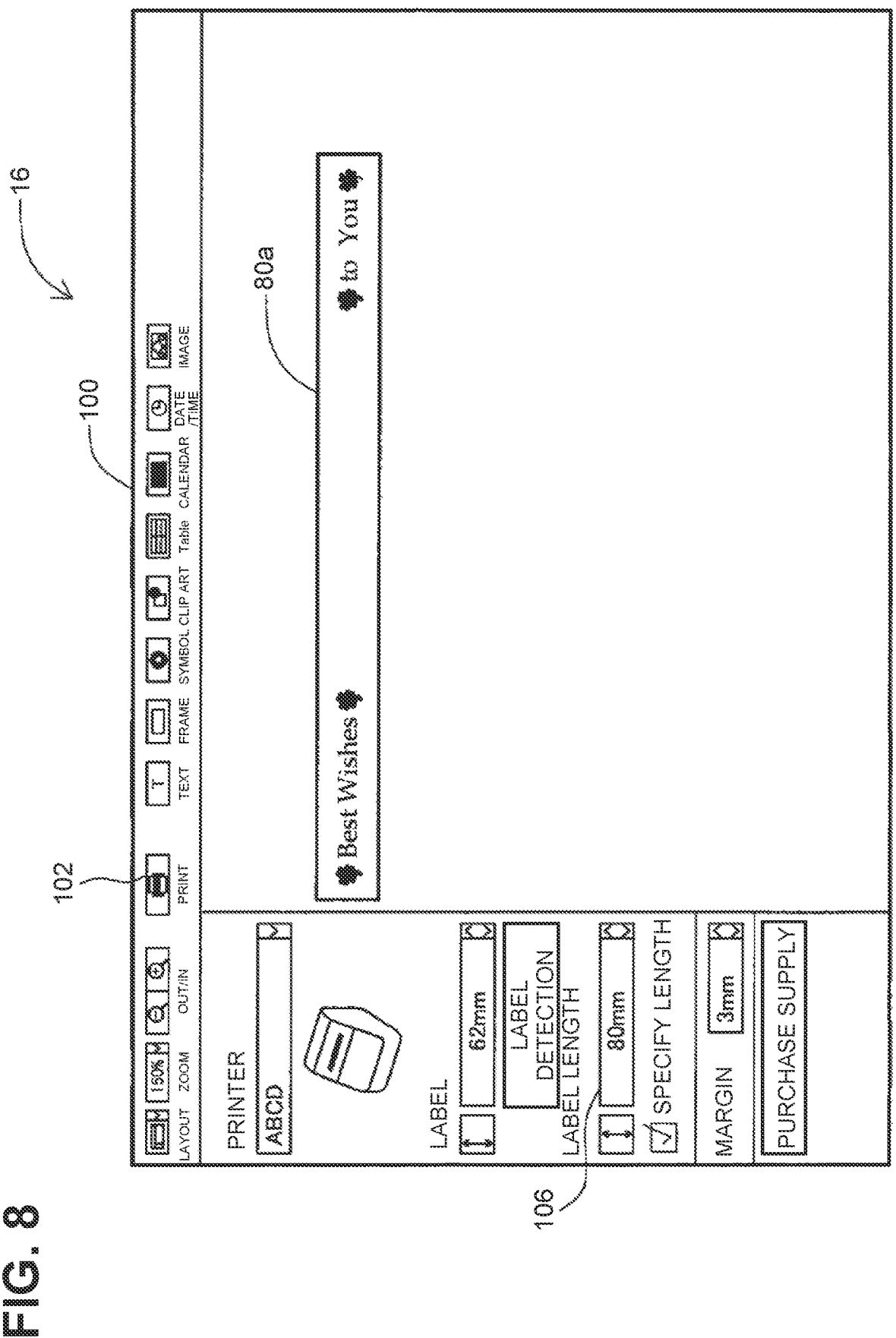
FIG. 8 illustrates an edit screen.

For example, when a template image 80*a* is selected on the template selection screen 82, the LCD 16 displays an edit screen 100 including the template image 80*a* as illustrated in FIG. 8. The template image 80*a* has, as objects, a pair of clover-shaped symbols and a default text "Best Wishes" sandwiched between the clover-shaped symbols in its leading end portion (or its left portion), and another pair of clover-shaped symbols and a default text "to You" sandwiched between the clover-shaped symbols in its trailing end portion (or its right end portion). The edit screen 100 allows not only inserting a text in a template image 80 but also changing a label length.

Specifically, the edit screen 100 has a label length field 106 to the left of the template image 80. A number is entered in the label length field 106 thereby changing a length of the template image 80. For example, vector image data for the template image 80*a*, which is image data the CPU 12 obtains from the server, includes "80 mm" as information indicating a length of the template. When the template image 80*a* is selected on the template selection screen 82, the edit screen 100 displays the template image 80*a* having a length corresponding to 80 mm as illustrated in FIG. 8. In this case, the label length field 106 indicates 80 mm.

Figure 9:
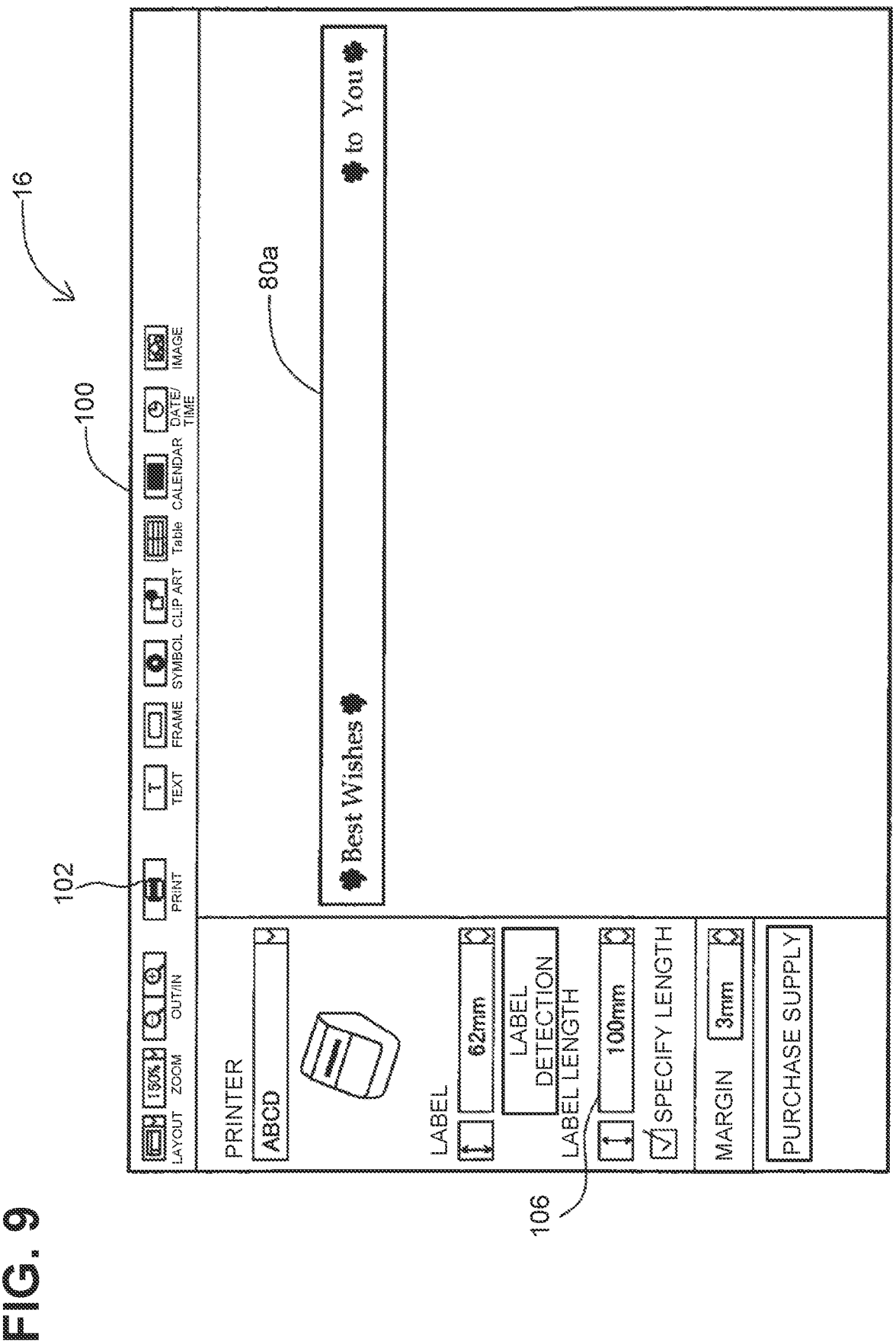
FIG. 9 illustrates an edit screen.
Figure 10:
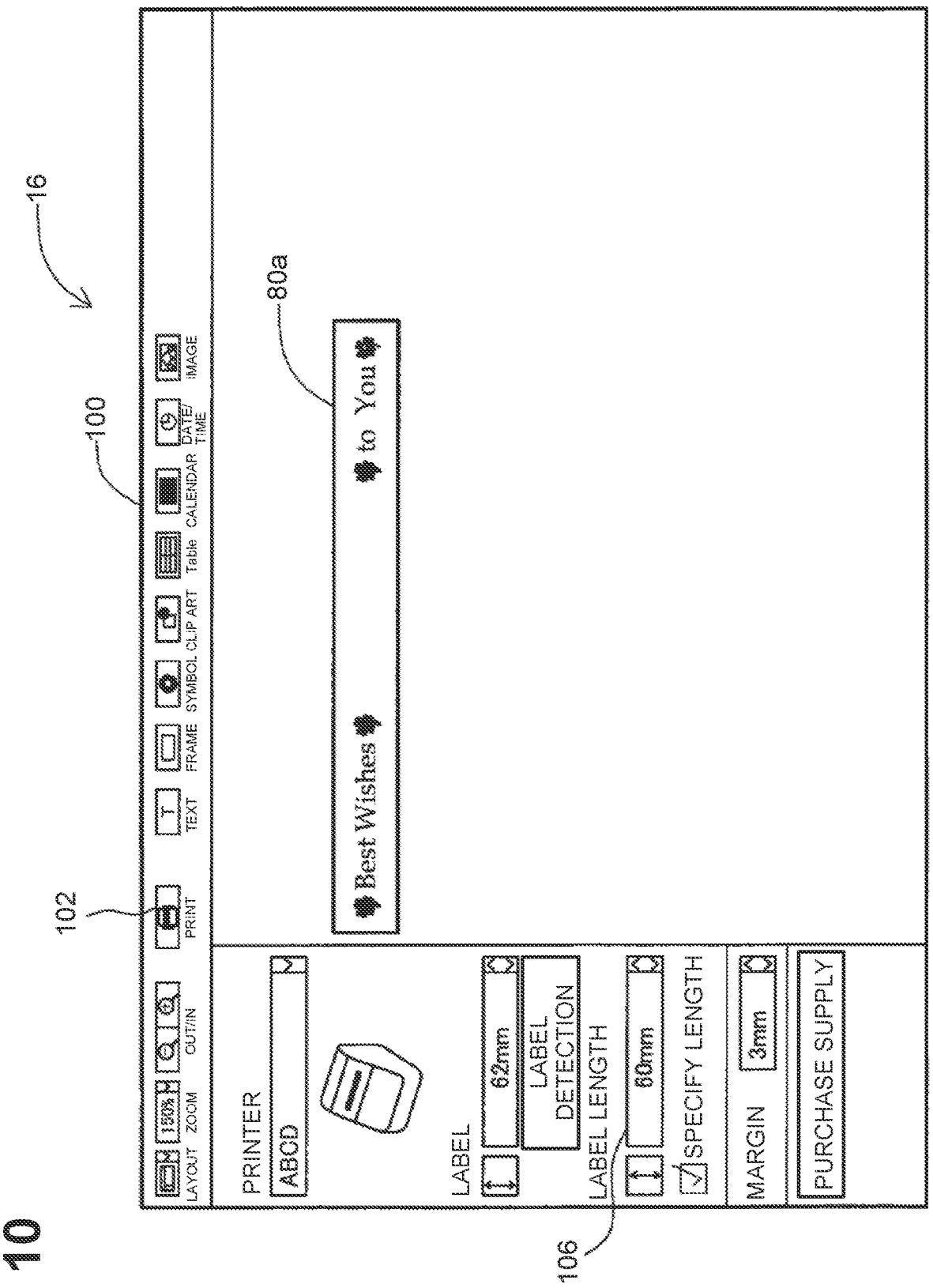
FIG. 10 illustrates an edit screen.

In response to a user input of "100 mm" in the label length field 106, the edit screen 100 displays the template image 80*a* having a length corresponding to 100 mm as illustrated in FIG. 9. In other words, the edit screen 100 displays the template image 80*a* becoming elongated in its longitudinal direction. In the template image 80*a*, a middle portion, which is blank, between the leading end portion having the clover-shaped symbols and the text and the trailing end portion having the clover-shaped symbols and the text is extended. In response to a user input of "60 mm" in the label length field 106, the edit screen 100 displays the template image 80*a* having a length corresponding to 60 mm as illustrated in FIG. 10. In other words, the edit screen 100 displays the template image 80*a* becoming shrunken in its longitudinal direction. In the template image 80*a*, a middle portion, which is blank, between the leading end portion having the clover-shaped symbols and the text and the trailing end portion having the clover-shaped symbols and the text is shrunken.

For the template image 80*a*, the middle portion of the template image 80*a* corresponds to a middle portion of a label. The label length is changeable in accordance with the length of the middle portion of the label to be extended or shrunken in response to a user operation. The template image 80*a* is generated from vector image data that the CPU 12 obtains from the server. The vector image data includes information indicating that the label length varies by extending or shrinking the length of the middle portion.

In response to an operation of the print button 102 on the edit screen 100 showing the template image 80*a* having a length corresponding to 100 mm, the CPU 12 generates image data for printing the symbols and the text of the template image 80*a* on a 100 mm label. In other words, the CPU 12 generates image data for printing the pair of clover-shaped symbols with the text "Best Wishes" sandwiched therebetween in the leading end portion of the 100 mm label, and image data for printing the pair of clover-shaped symbols with the text "to You" sandwiched therebetween in the trailing end portion of the 100 mm label. This enables printing the clover-shaped symbols and the text in each end portion of the label having a length desired by a user.

Figure 11:
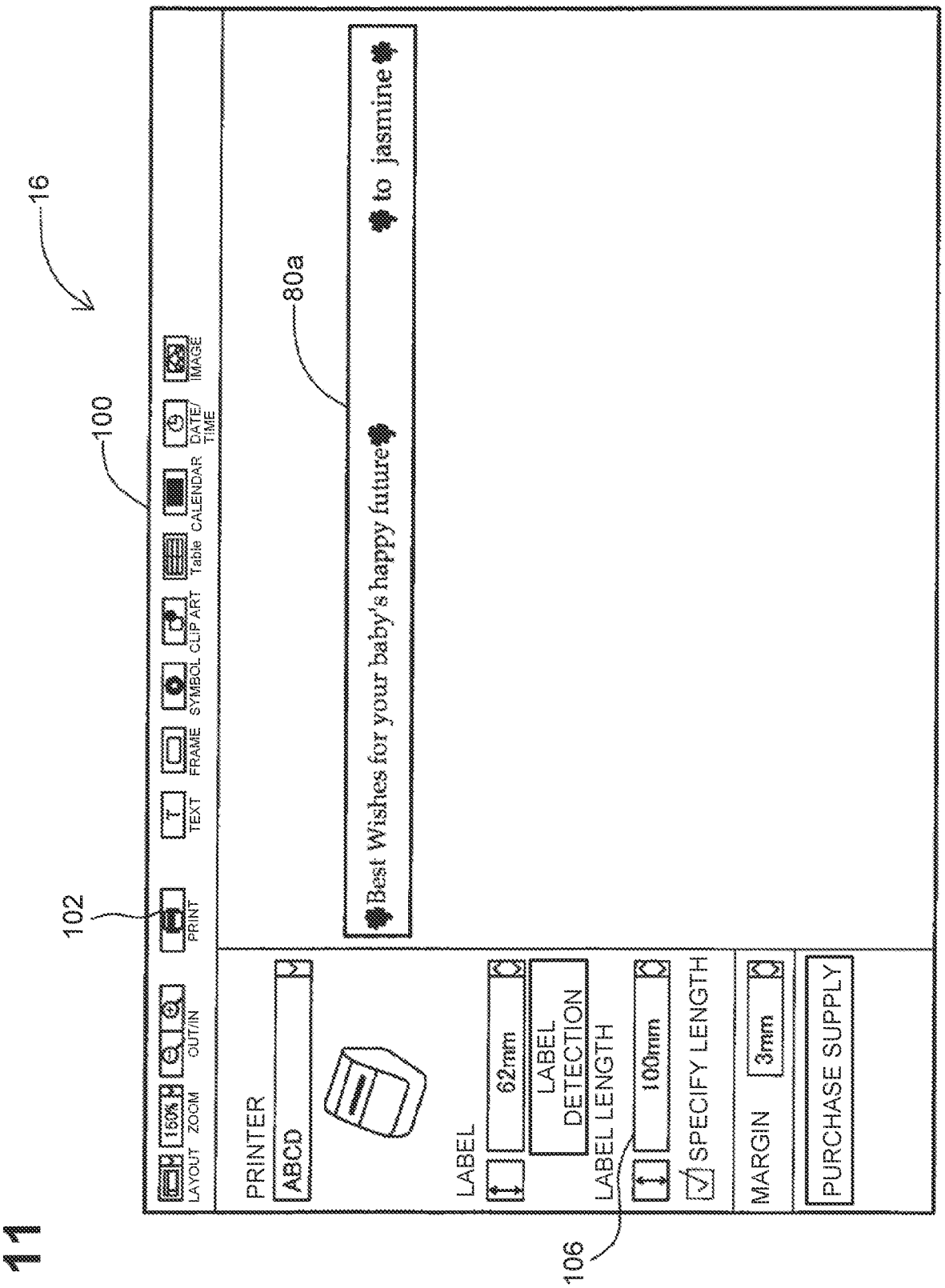
FIG. 11 illustrates an edit screen.

The template image 80*a* is generated from vector image data including information indicating that the text area is set to "automatic length" and that the label length is set to "Auto". For the template image 80*a* as with the template image 80*d*, the length of the text area is changeable in association with the length of the whole text, and the label length is changeable with change of the text area. As illustrated in FIG. 11, as a user inserts, via the input interface 18, a text "for your baby's happy future" in the leading end portion of the template image 80*a* and replaces "You" with "jasmine" in the trailing end portion, the text "Best Wishes for your baby's happy future" and the text "to jasmine" remain not reduced and appear in the template image 80*a* with its length extended. In the template image 80*a*, the middle portion between the leading end portion having the clover-shaped symbols and the text and the trailing end portion having the clover-shaped symbols and the text is extended.

The vector image data of the template image 80*a* further includes information indicating that the clover-shaped symbols are changeable. The clover-shaped marks of the template image 80*a* can be changed to different symbols on the edit screen 100.

For the template image 80*d* as with the template image 80*a*, the label length is changeable in response to a user operation. For example, vector image data for the template image 80*d*, which is image data the CPU 12 obtains from the server, includes information indicating "40 mm" as a length of the template. When the template image 80*d* is selected on the template selection screen 82, the edit screen 100 displays the template image 80*d* having a length corresponding to 40 mm as illustrated in FIG. 6. In this case, the label length field 106 indicates 40 mm.

Figure 12:
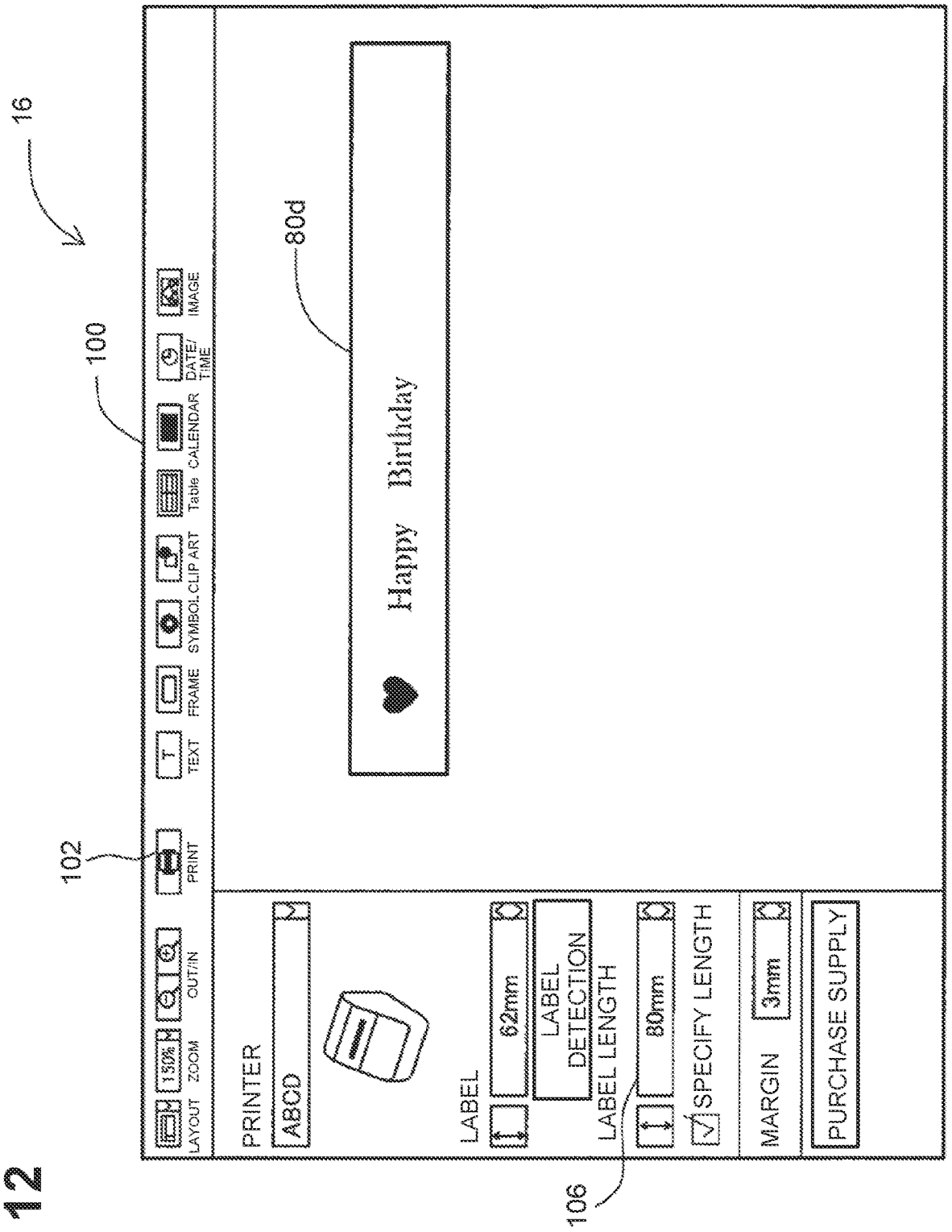
FIG. 12 illustrates an edit screen.

In response to a user input of "80 mm" in the label length field 106, the edit screen 100 displays the template image 80*d* having a length corresponding to 80 mm as illustrated in FIG. 12. In other words, the edit screen 100 displays the template image 80*d* becoming elongated in its longitudinal direction. For the template image 80*d*, a portion opposite to its leading end portion having the heart-shaped symbol and the text, that is, its trailing end portion is extended. For the template image 80*d*, the label length is changeable in response to a user operation.

For the template images 80*a* and 80*d*, as the number of text characters being inserted increases, the text area is enlarged with the font size of the text remaining maintained, and the label length is increased accordingly. For the template image 80*a*, its middle portion is extended. For the template image 80*d*, its trailing end portion is extended. The CPU 12 generates image data for printing such that objects are printed on the extended label. For the template image 80c, the label has a preset length. As the number of text characters being inserted increases, the size of the text area remains unchanged and the font size of the text is reduced. The CPU 12 generates image data for printing such that objects are printed on the label with the preset length.

For the template image 80a more additionally, the label length is changeable in response to a user operation. The middle portion of the template image 80a is extended or shrunken to change the label length. For the template image 80d, the label length is changeable in response to a user operation. The trailing end portion of the template image 80d is extended or shrunken to change the label length. For the template image 80b as with the template image 80c, the label has a preset length. As the number of text characters being inserted increases, the size of the text area remains unchanged and the font size of the text is reduced. The CPU 12 generates image data for printing such that objects are printed on the label with the preset length.

As described above, the methods of generating image data for printing differ with each other according to the template images 80 selectable on the template selection screen 82. The existing template selection screen 82 displays the template images 80a, 80b, 80c, 80d in the same manner, which hinders a user operation to recognize a method of generating image data for printing. A user who desires to make various labels with a fixed font size may happen to select the template image 80c on the existing template selection screen 82 illustrated in FIG. 3. The user may insert a text with more characters in the template image 80c on the edit screen 100, and may recognize that the font size of the text becomes smaller. In this case, the user may need to return to the template selection screen 82 to select an appropriate template image 80 other than the template image 80c. A user who desires to make various labels with a fixed label length may happen to select the template image 80d. The user may insert a text with more characters in the template image 80d on the edit screen 100, and may recognize that the label length of the template image 80d increases. In this case, the user may need to return to the template selection screen 82 to select an appropriate template image 80 other than the template image 80d. The existing edit screen 100 that does not display methods of generating image data for printing in a discernible manner may hinder a user operation.

Figure 15:
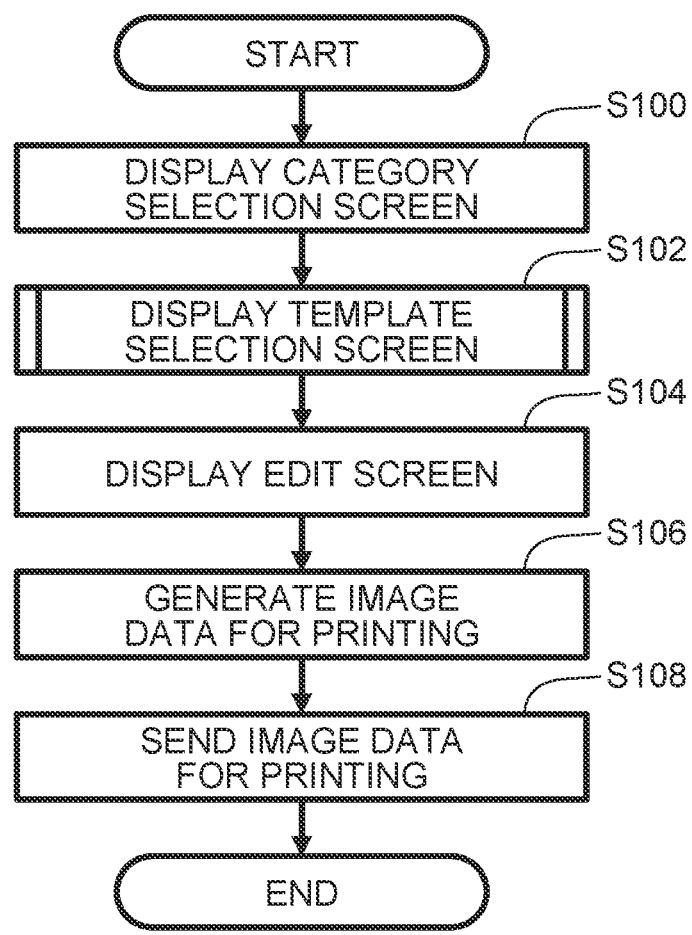
FIG. 15 is a flowchart of a control program.
Figure 16:
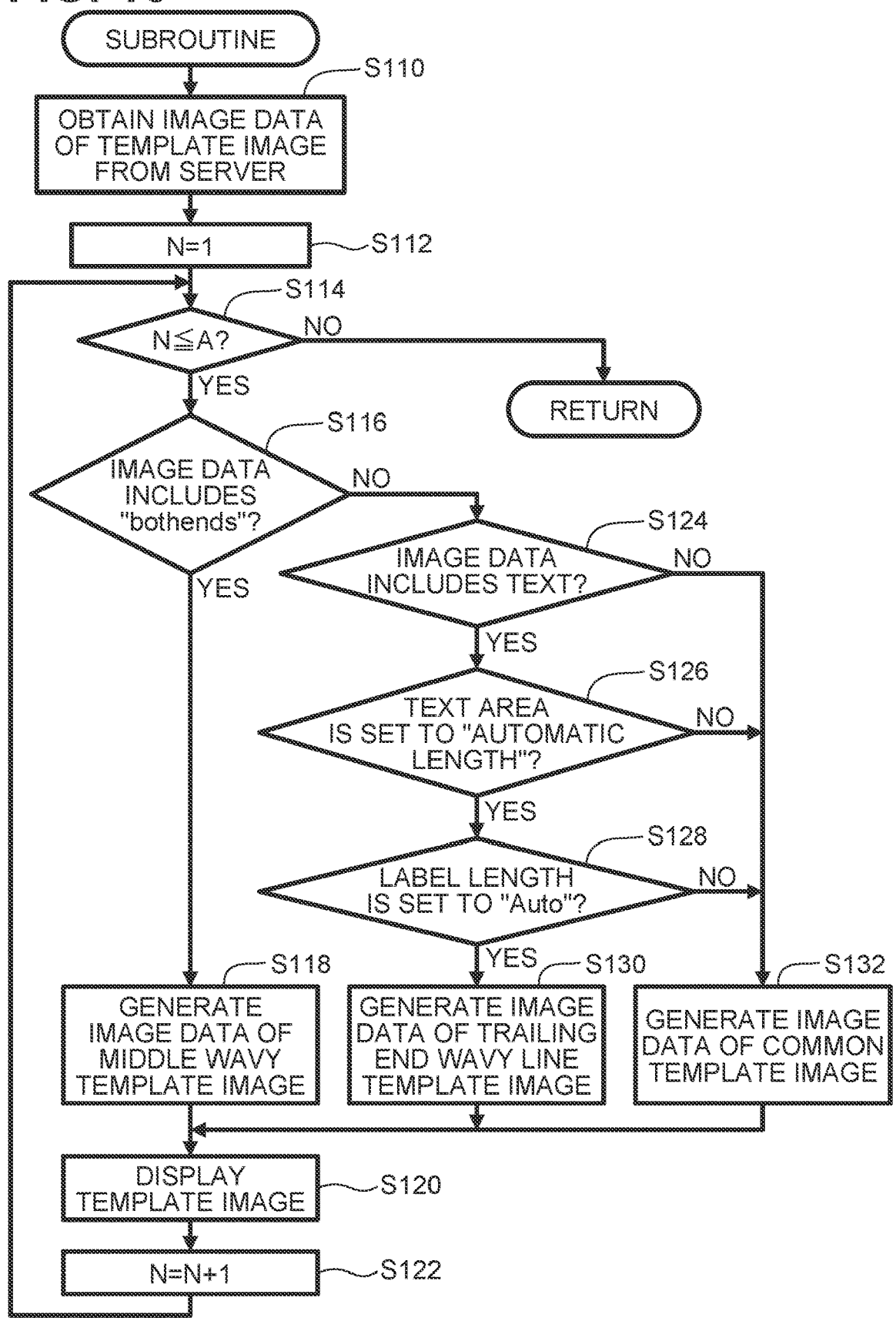
FIG. 16 is a flowchart of the control program.

The PC 10 enables the LCD 16 to display a new template selection screen on which template images are displayed in a manner such that methods of generating image data for printing are discernible. With reference to FIGS. 15 and 16, processes of the CPU 12 for displaying the new template screen will be described.

The CPU 12 allows the LCD 16 to display a category selection screen 70 in the same manner as described above (S100). In response to a user selection of a selection button 72 on the category selection screen 70, the CPU 12 executes a template selection screen display subroutine to display a template selection screen (S102). In the template selection screen display subroutine, the CPU 12 obtains vector image data of template images belonging to a category assigned to the selected selection button 72 from the server 52 (S110). To analyze image data for every template image, the CPU 12 sets a template image number N to 1 (S112).

The CPU 12 determines whether the template image number N is smaller than or equal to "A" (S114). "A" indicates the number of template images corresponding to the image data obtained from the server 52. For example, when the CPU 12 obtains four pieces of image data for four template images from the server 52, "A" is four. If the template image number N is smaller than or equal to "A" (S114: YES), the CPU 12 determines whether the image data of the template image under analysis includes "bothends" (S116). As described above, "bothends" is included in the image data of the template image 80a, and the middle portion of the template image 80a is extended or shrunken in accordance with change in the label length. If the image data of the template image under analysis includes "both-ends" (S116: YES), the CPU 12 generates, based on the image data, image data of a template image having wavy lines for abbreviation in its middle portion (hereinafter referred to as a middle wavy line template image) (S118). The CPU 12 allows the LCD 16 to display a central wavy line template image 112a (refer to FIG. 13) based on the image data (S120). The CPU 12 adds "1" to the template image number N (S122) and returns to S114.

If the image data of the template image under analysis does not include "bothends" (S116: NO), the CPU 12 determines whether the image data of the template image under analysis includes information on text data as a data type of an object (S124). If the image data of the template image under analysis includes information on text data as a data type of an object (S124: YES), the CPU 12 determines whether the image data of the template image under analysis includes information that the text area is set to "automatic length" (S126). If the image data of the template image under analysis includes information that the text area is set to "automatic length" (S126: YES), the CPU 12 determines whether the image data of the template image under analysis includes information that the label length is set to "Auto" (S128).

As described above, the image data of each of the template images 80a and 80d includes information indicating that the text area is set to "automatic length" and the label length is set to "Auto", and the image data of the template image 80d does not include "bothends". If the image data of the template image under analysis includes information that the label length is set to "Auto" (S128: YES), the image data of the template image under analysis includes an attribute that a label length is changeable and a trailing end portion of the template image is extendable to change the label length. The CPU 12 generates, based on the image data of the template image under analysis, image data of a template image having a wavy line for abbreviation in its trailing end (hereinafter referred to as a trailing end wavy line template image) (S130). The CPU 12 allows the LCD 16 to display a trailing end wavy line template image 112d (refer to FIG. 13) based on the image data (S120). The CPU 12 adds "1" to the template image number N (S122) and returns to S114.

If the image data of the template image under analysis does not include information on text data as a data type of an object (S124: NO), it indicates no text to insert and thus no change in the label length. If the image data of the template image under analysis does not include information that the text area is set to "automatic length" (S126: NO) or does not include information that the label length is set to "Auto" (S128: NO), it also indicates no change in the label length in accordance with a text to insert. In these cases (S124: NO, S126: NO, S128: NO), the CPU 12 generates, based on the image data of the template image under analysis, image data of a common or existing template image having no wavy lines for abbreviation (S132). The CPU 12 allows the LCD 16 to display a common template image 112b or 112c (refer to FIG. 13) based on the image data (S120). The CPU 12 adds "1" to the template image number N (S122) and returns to S114.

Figure 13:
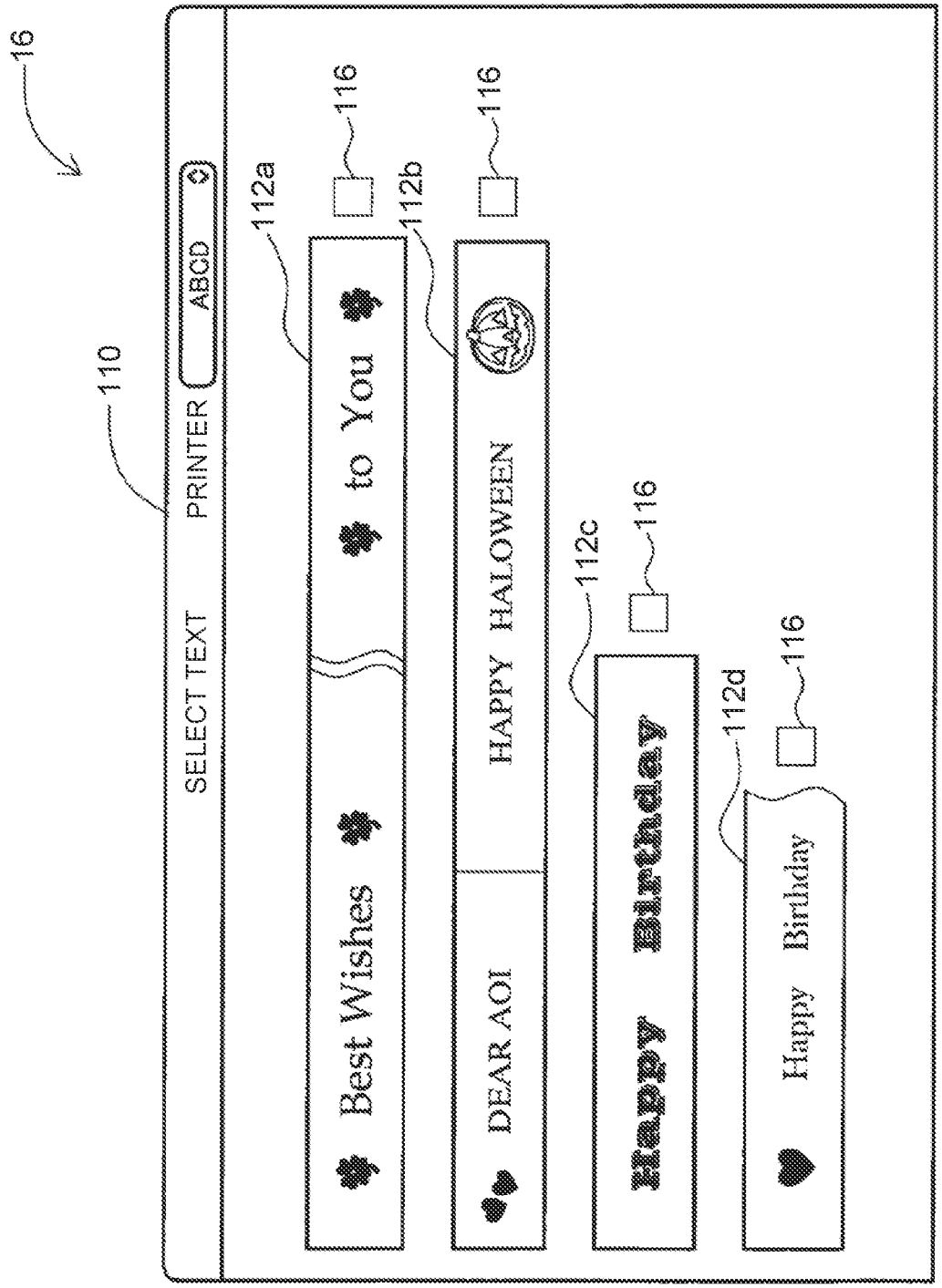
FIG. 13 illustrates a template selection screen.

After the CPU 12 executes steps S116 to S132 on all the image data obtained from the server 52, the template images 112a to 112d illustrated in FIG. 13 are displayed on a new template selection screen 110 (as an example of a selection screen). At this time, the CPU 12 determines that the template image number N is greater than "A" (S114: NO) and ends the template selection screen display subroutine.

On the new template selection screen 110, the template images 112a and 112d appear with wavy lines for abbreviation to indicate their label lengths are changeable, and the template images 112b and 112c appear without wavy lines to indicate their label lengths are unchangeable. This allows a user to identify that the template images 112a and 112d each have a fixed font size and a changeable label length and the template images 112b and 112c each have a fixed label length and a changeable font size. For the template images 112a and 112d, a wavy line is indicated at a portion of a label to be extended or shrunken when its label length is changed. This allows a user to recognize which portion of the template image 112a or 112d is to be extended or shrunken and appropriately imagine a label after objects are printed.

Figure 14:
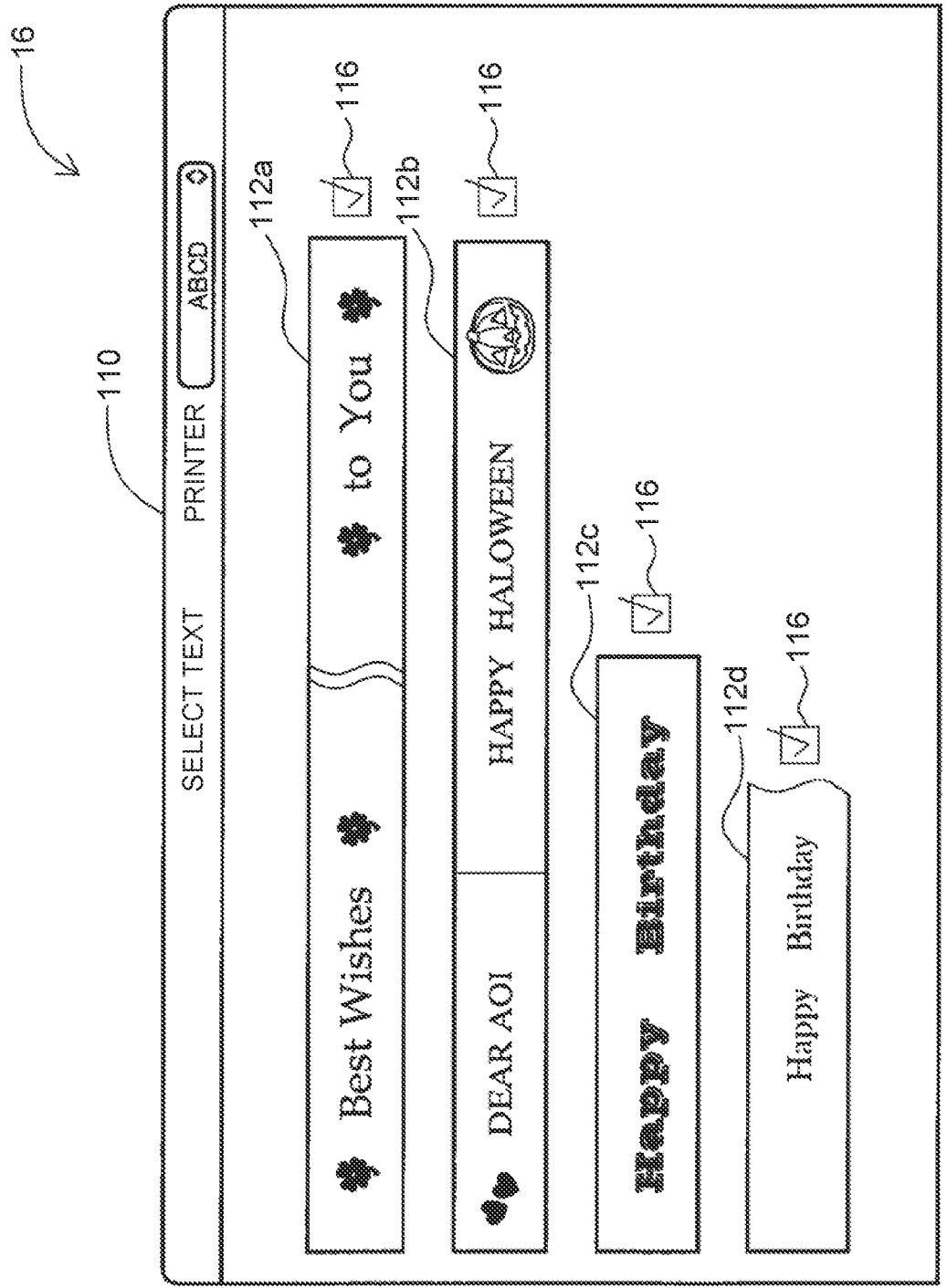
FIG. 14 illustrates a template selection screen.

The template selection screen 110 can display editable objects such that the editable objects and uneditable objects are in a discernible manner. Specifically, the template selection screen 110 displays checkboxes 116 corresponding to the template images 112. When a checkmark is placed in a checkbox 116, as illustrated in FIG. 14, a template image 112 having the checkmark placed in the checkbox 116 appears with editable objects only. Uneditable objects are hidden.

For the template image 112a, for example, the clover-shaped symbols as well as the texts are changeable by a user. Thus, the template image 112a having the checkmark placed in the checkbox 116 appears with the clover-shaped symbols and the texts. Contrastingly, for the template image 112d, the heart-shaped symbols are unchangeable and the text are changeable by a user as described above. Thus, the template image 112d having the checkmark placed in the checkbox 116 appears with the text only. The heart-shaped symbols are hidden. For the template image 112c, its object is a text only. Thus, the template image 112c having the checkmark placed in the checkbox 116 appears with the text only. For the template image 112b, all objects are changeable by a user. Thus, the template image 112b having the checkmark placed in the checkbox 116 appears with all objects. This allows the user to easily discern editable objects from uneditable objects on the template selection screen 110.

In response to a user selection of a template image 112 on the template selection screen 110, the CPU 12 allows the LCD 16 to display an edit screen 100 including the selected template image 112 (S104). Incidentally, the edit screen 100 displays the template images 112b and 112c without wavy lines for abbreviation. In response to an operation of the print button 102 on the edit screen 100 after edit operations such as text insertion are performed or a label length is changed by a user, the CPU 12 generates image data for printing objects in the template image 112 (S106). The CPU 12 then sends the generated image data for printing to the printer 50 (S108). The printer 50 executes label printing.

Step S102 executed by the CPU 12 is an example of an operation of displaying a selection screen. Step S104 executed by the CPU 12 is an example of an operation of displaying an edit screen. Step S106 executed by the CPU 12 is an example of an operation of generating edit image data. Step S108 executed by the CPU 12 is an example of an operation of outputting the generated edit image data.

According to the above embodiment, the following effects are obtained.

The above embodiment describes multiple text edit methods using template images 112. Each template image is associated with a text edit method of the text edit methods. When a text is edited using a template image, the text is edited in accordance with a text edit method associated with the template image. The template selection screen 110 thus displays the template images in such a manner that their associated edit methods are discernible. This allows the user to select a desired template image after recognizing its text edit method on the template selection screen 110.

The text edit methods include a first edit method where a text area is changed in accordance with a text to be inserted, and image data is generated to print the text inserted in the changed text area. The text edit methods include a second edit method where image data is generated to print a text inserted in a specific size of text area regardless of the text length or the number of characters in the text. The first edit method enables changing the text area in accordance with the text length and thus producing multiple labels with the same font size. The second edit method enables producing multiple labels with the same sized text areas regardless of the text length.

In the first edit mode, a text area is changed in size to accommodate a text in a specific font size, and image data is generated to print the text in the specific font size in the text area changed in size. In the second edit mode, a font size of a text is changed to fit the text in a specific size of text area, and image data is generated to print the text in the changed font size in the specific size of text area. The first edit method enables producing multiple labels with the same font size regardless of the number of characters in a text. The second edit method enables producing multiple labels with the same sized text areas regardless of the number of characters in a text.

Template images editable using the first edit method appear with wavy lines for abbreviation on the template selection screen 110. In other words, the template selection screen 110 displays a template image editable using the first edit method in a manner indicating its text area is changeable. This allows the user to appropriately select a template image with a changeable text area on the template selection screen 110.

A label length to be changed in response to a user operation is changeable by multiple edit methods. Each template image is associated with a certain edit method of the multiple edit methods. When image data for printing is generated using a template image, objects are to be printed on a label whose length is changed in accordance with an edit method associated with the template image. The template selection screen 110 thus displays the template images in such a manner that their associated edit methods are discernible. This allows the user to select a desired template image after recognizing a method to change a label length on the template selection screen 110.

For the template image 112a having objects in both end portions, the objects are to be printed on a label whose length is changed by extending or shrinking its middle portion. In contrast, for the template image 112d having objects in its leading end portion and no objects in its trailing end portion, the objects are to be printed on a label whose length is changed by extending or shrinking the trailing end portion having no objects. As a label is extended or shrunken in its portion having no objects, objects to be inserted can be printed on the label having an appropriate length.

On the template selection screen 110, the template image 112a having objects in both end portions appears with wavy lines for abbreviation in its middle portion, while the template image 112d having objects in its leading end portion appears with a wavy line for abbreviation in its trailing end portion. This allows the user to select a desired template image after recognizing a portion of a label to be extended or shrunken on the template selection screen 110.

When a checkmark is placed in a checkbox 116 on the template selection screen 110, a template image 112 having the checkmark placed in the checkbox 116 appears with editable objects only. Uneditable objects are hidden. In other words, the template selection screen 110 can display editable objects such that the editable objects and uneditable objects are in a discernible manner. This allows the user to select a desired template image after discriminating between editable objects and uneditable objects on the template selection screen 110.

The disclosed herein is not limited to the above embodiment, and various modifications and improvements can be made on the basis of the knowledge of those skilled in the art. Specifically, the above embodiment illustrates that texts are editable using a plurality of edit methods and the template selection screen 110 displays text edit methods in a discernible manner. In some embodiments, the template selection screen may display edit methods associated with editable objects such as symbols, illustrations, frames, bar codes, and backgrounds, in a discernible manner.

In the above embodiment, the PC 10 includes the control program 30. In some embodiments, the printer 50 may include a program equivalent to the control program 30 (e.g., a firmware of the printer 50). In this case, the printer 50 may further include a display and an input interface to execute the above described processes of the PC 10 on the printer 50. In other words, the printer 50 may be able to execute steps illustrated in FIGS. 15 and 16. When the printer 50 executes the steps illustrated in FIGS. 15 and 16, step S108 is changed to a process for printing based on image data for printing. When the printer 50 includes a program equivalent to the control program 30, the printer 50 is an example of an information processing apparatus.

In the above embodiment, the template selection screen 110 discernibly displays template images 112 each including an extendable portion of a text area according to text editing or a portion of a label whose length is extendable by a user operation with a wavy line for abbreviation. Instead of the wavy line, a symbol, a character, a comment, or other signs may be used. A user notification explaining the extendable portion of a text area or the portion of a label whose length is extendable may be disposed adjacent to corresponding label.

In the above embodiment, when a checkmark is placed in a checkbox 116 on the template selection screen 110, a template image 112 having the checkmark placed in the checkbox 116 appears with editable objects only, and uneditable objects are hidden. The template selection screen may display editable objects and uneditable objects in various discernible manners. For example, the template selection screen 110 may display editable objects and uneditable objects in a different manner (discernible by colors, patterns, blinking, symbols, characters, comments, or other elements). This allows a user to edit editable objects while considering displayed uneditable objects.

In the above embodiment, template images are used for label printing. The template images may be used for printing on not only a label but also a different print medium.

The above embodiment describes process steps or operations illustrated in FIGS. 15 and 16 executed by the CPU 12. The operations may be executed by not only the CPU 12 but also an application-specific integrated circuit (ASIC) or a logic integrated circuit, or by cooperation of the CPU, the ASIC, and the logic integrated circuit.

What is claimed is:

1. A non-transitory computer-readable recording medium storing a program executable by a computer of an information processing apparatus, the program causing the computer to perform operations comprising:
    displaying a selection screen on a display, the selection screen including a first template image and a second template image to be selected, each of the first template image and the second template image being used for editing in response to an edit operation, the edit operation being associated with each of a first edit method and a second edit method, each of the first template image and the second template image being associated with a corresponding edit method, the selection screen being displayed such that each of the first edit method and the second edit method associated with a corresponding template image is in a discernible manner, each of the first template image and the second template image including an object arranged in a corresponding template image;
    in response to receiving an operation of selection of a template image from the first template image and the second template image displayed on the selection screen, displaying an edit screen including the selected template image;
    in response to receiving the edit operation on the edit screen to edit an object arranged in the selected template image, generating edit image data of an edit image including the object having underwent the edit operation, the edit image data being generated using an edit method associated with the selected template image; and
    outputting the generated edit image data.

2. The non-transitory computer-readable recording medium according to claim 1,
    wherein each of the first template image and the second template image has an arrangement area set to arrange an object therein,
    wherein the first template image has an arrangement area changeable in size, the first template image being associated with the first edit method to change a size of the arrangement area in accordance with the edit operation and arrange an object in the arrangement area with the size changed,
    wherein the second template image has an arrangement area unchangeable in size, the second template image being associated with a second edit method to arrange an object in the arrangement area with a specified size in accordance with the edit operation, and
    wherein, in response to the first template image being selected, the generating generates edit image data of an edit image having the object arranged in the arrangement area with the size changed, and
    wherein, in response to the second template image being selected, the generating generates edit image data of an edit image having the object arranged in the arrangement area with the specified size.

3. The non-transitory computer-readable recording medium according to claim 2,
wherein the first edit method is configured to change the size of the arrangement area such that the object with a specific size is arranged in association with the edit operation and arrange the object with the specific size in the arrangement area with the size changed, and
wherein, in response to the first template image being selected, the generating generates the edit image data of the edit image having the object with the specific size arranged in the arrangement area with the size changed.

4. The non-transitory computer-readable recording medium according to claim 2,
wherein the second edit method is configured to change a size of the object such that the object is arranged in the arrangement area with the specific size in accordance with the edit operation and arrange the object with the size changed in the arrangement area with the specific size, and
wherein, in response to the second template image being selected, the generating generates edit image data of an edit image having the object with the size changed arranged in the arrangement area with the specific size.

5. The non-transitory computer-readable recording medium according to claim 2,
wherein the displaying the selection screen displays the selection screen such that the first template image is associated with a mark indicating the object to be arranged in the arrangement area with the size changed.

6. The non-transitory computer-readable recording medium according to claim 1,
wherein the object includes an editable object and an uneditable object by the edit operations, and
wherein the displaying the selection screen displays the selection screen such that the editable object and the uneditable object are in a discernible manner.

7. A non-transitory computer-readable recording medium storing a program executable by a computer of an information processing apparatus, the program causing the computer to perform operations comprising:
displaying a selection screen on a display, the selection screen including a first template image and a second template image to be selected, each of the first template image and the second template image being used for editing in response to an edit operation, each of the first template image and the second template image including an object arranged in a corresponding template image, the object including an editable object and an uneditable object by the edit operation, the selection screen being displayed such that editable object and the uneditable object are in a discernible manner;
in response to receiving an operation of selection of a template image from the first template image and the second template image displayed on the selection screen, displaying an edit screen including the selected template image;
in response to receiving the edit operation on the edit screen to edit an object arranged in the selected template image, generating edit image data of an edit image including the object having underwent the edit operations, the edit image data being generated using an edit method associated with the selected template image; and
outputting the generated edit image data.

8. The non-transitory computer-readable recording medium according to claim 1,
wherein the program further causes the computer to perform operations comprising:
receiving a change operation to change, on the edit screen, a length of a print medium on which an object arranged in the selected template image is to be printed,
wherein the generating generates the edit image data corresponding to the changed length of the print medium.

9. The non-transitory computer-readable recording medium according to claim 8,
wherein the first template image has a first object in one end portion and a second object in another end portion, the first template image being associated with the first edit method to change a length of a middle portion of a first print medium in a longitudinal direction of the first print medium in accordance with the change operation, the middle portion of the first print medium corresponding to a middle portion of the first template image between the one end portion and the other end portion thereof,
wherein the second template image has an object in one end portion and no object in another end portion, the second template image being associated with the second edit method to change a length of an end portion of a second print medium in a longitudinal direction of the second print medium in accordance with the change operation, the end portion of the second print medium corresponding to the other end portion of the second template image,
wherein, in response to the first template image being selected, the generating generates image data for printing of the first object and the second object arranged in the one end portion and the other end portion of the first template image on the first print medium with the length of the middle portion changed in the longitudinal direction of the first print medium, and
wherein, in response to the second template image being selected, the generating generates image data for printing of the object arranged in the one end portion of the second template image on the second print medium with the length of the end portion changed in the longitudinal direction of the second print medium.

10. The non-transitory computer-readable recording medium according to claim 9,
wherein the displaying the selection screen displays the first template image associated with a mark indicating that the length of the middle portion, corresponding to the middle portion of the first template image, of the first print medium is changeable in the longitudinal direction of the first print medium and the second template image associated with a mark indicating that the length of the end portion, corresponding to the end portion of the second template image, of the second print medium is changeable in the longitudinal direction of the second print medium.

11. An information processing apparatus comprising:
a display; and
a controller configured to:
display a selection screen on a display, the selection screen including a first template image and a second template image to be selected, each of the first template image and the second template image being used for editing in response to an edit operation, the edit operation being associated with each of a first edit method and a second edit method, each of the first template image and the second template image being associated with a corresponding edit method, the selection screen being displayed such that each of the first edit method and the second edit method associated with a corresponding template image is in a discernible manner, each of the first template image and the second template image including an object arranged in a corresponding template image;

in response to receiving an operation of selection of a template image from the first template image and the second template image displayed on the selection screen, display an edit screen including the selected template image;

in response to receiving the edit operation on the edit screen to edit an object arranged in the selected template image, generate edit image data of an edit image including the object having underwent the edit operation, the edit image data being generated using an edit method associated with the selected template image; and output the generated edit image data.

12. An information processing apparatus comprising:
a display; and
a controller configured to:
  display a selection screen on a display, the selection screen including a first template image and a second template image to be selected, each of the first template image and the second template image being used for editing in response to an edit operation, each of the first template image and the second template image including an object arranged in a corresponding template image, the object including an editable object and an uneditable object by the edit operation, the selection screen being displayed such that editable object and the uneditable object are in a discernible manner;

in response to receiving an operation of selection of a template image from the first template image and the second template image displayed on the selection screen, display an edit screen including the selected template image;

in response to receiving the edit operation on the edit screen to edit an object arranged in the selected template image, generate edit image data of an edit image including the object having underwent the edit operations, the edit image data being generated using an edit method associated with the selected template image; and output the generated edit image data.

* * * * *